May 13, 1958 R. M. LAZZOPINA ET AL 2,834,095
METHOD OF MAKING DRUM TYPE SEQUENCE SWITCHES
Filed Oct. 16, 1956 2 Sheets-Sheet 1

INVENTORS
ROBERT M. LAZZOPINA
JOSEPH V. D'ONOFRIO
BY Victor D. Borst
ATTORNEY

May 13, 1958    R. M. LAZZOPINA ET AL    2,834,095
METHOD OF MAKING DRUM TYPE SEQUENCE SWITCHES
Filed Oct. 16, 1956      2 Sheets-Sheet 2
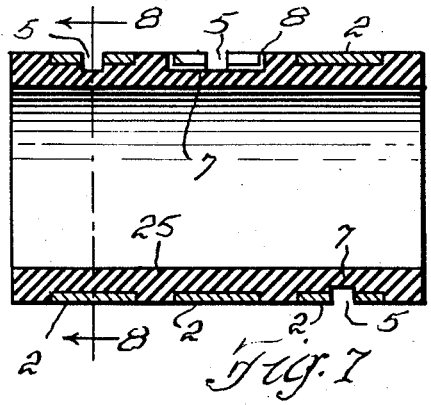
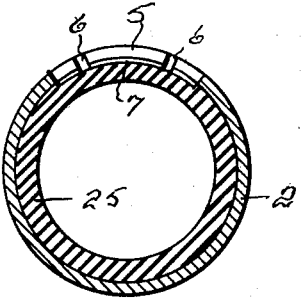
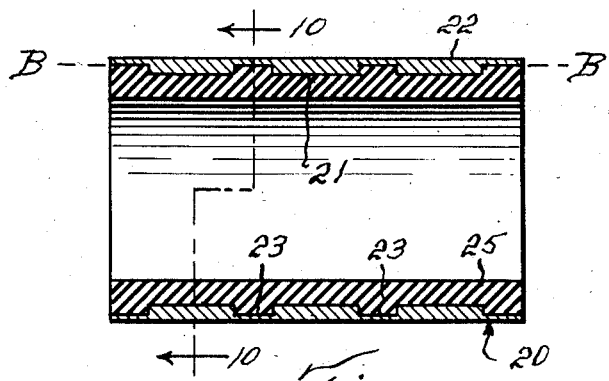
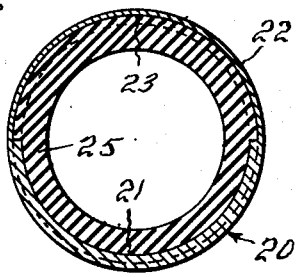
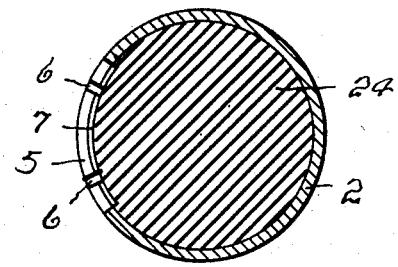
INVENTORS
ROBERT M. LAZZOPINA
JOSEPH V. D'ONOFRIO
BY *Victor N. Borst*
ATTORNEY

United States Patent Office 2,834,095
Patented May 13, 1958

2,834,095

METHOD OF MAKING DRUM TYPE SEQUENCE SWITCHES

Robert M. Lazzopina, Flushing, and Joseph V. D'Onofrio, Hicksville, N. Y., assignors to Sperry Rand Corporation, Ford Instrument Company Division, Long Island City, N. Y., a corporation of Delaware Application October 16, 1956, Serial No. 616,335

1 Claim. (Cl. 29—155.5)

This invention relates to sequence switches by which a plurality of electric circuits are simultaneously controlled, and to the method of producing such switches.

Sequence switches of this type generally comprise a plurality of spaced parallel contact segments or slip rings which are embedded in a suitable thermosetting plastic insulating material. These segments or slip rings are slotted both longitudinally and transversely in accordance with the particular circuits to be controlled thereby.

Heretofore in producing sequence switches of this type the individual slip rings were pre-machined and assembled into a special stacking fixture in which the relation of one segment to another was closely held. This assembly was then molded into a single unit of the desired size. This necessitated the pre-precision machining of the small segments or slip rings and the special stacking fixture.

In producing sequence switches according to our new and improved method we provide an open ended cylindrical tube of the requisite size and form a plurality of spaced parallel grooves in the inner surface thereof. A hub is then inserted axially into the tube and the cavity between the hub and the tube is filled with suitable thermosetting plastic insulating material. The outer surface of the tube is then machined to a depth sufficient to remove the tubing material surrounding the grooves which provides a plurality of spaced parallel slip rings or segments which are embedded in the plastic insulating material. Longitudinal and transverse slots are then milled in each of the slip rings in accordance with the particular circuit each slip ring is to control.

The principal object of the invention is to provide a new and improved method of producing sequence switches, by which a plurality of individual electric circuits are simultaneously controlled, which method eliminates the pre-precision machining of small individual segments and the assembling thereof in a special stacking fixture.

Having stated the principal object of the invention, other and more limited objects of the invention will be apparent from the following specification and the accompanying drawings forming a part thereof in which:

Fig. 7 is a view similar to Fig. 2 illustrating a slightly modified form of the drum type sequence switch shown in Figs. 1 to 3 in which form the axially disposed hub is omitted;

Fig. 8 is a transverse vertical sectional view taken on the line 8—8 of Fig. 7;

Fig. 9 is a longitudinal sectional view showing the third step in the production of the sequence drum type switch as illustrated in Figs. 7 and 8;

Fig. 10 is a transverse vertical sectional view taken on the line 10—10 of Fig. 9; and Fig. 11 is a view similar to Fig. 8 taken through another modified form of a drum type sequence switch in which the hub shown in Figs. 1 to 3 is omitted.

Figure 1:
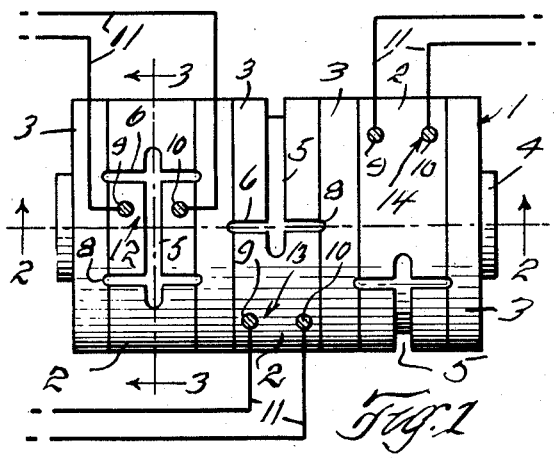
Fig. 1 is a side elevation of a sequence switch of the drum type which was constructed in accordance with our new and improved method of producing sequence contact switches by which a plurality of individual electric circuits are simultaneously controlled.
Figure 3:
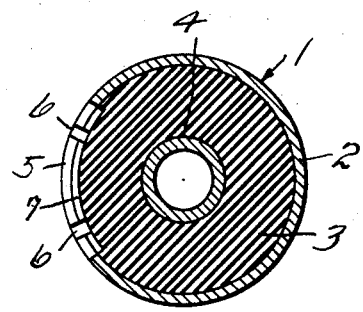
Fig. 3 is a transverse vertical sectional view taken on the line 3—3 of Fig. 1.
Figure 2:
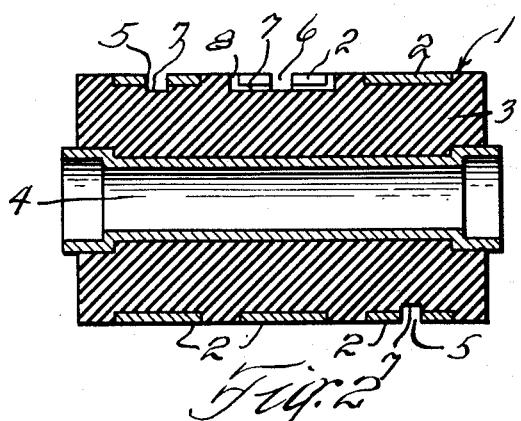
Fig. 2 is a longitudinal vertical sectional view taken on the line 2—2 of Fig. 1.

Referring first to Figs. 1 to 3 of the drawings by reference characters the numeral 1 indicates generally a sequence, contact drum type, switch which was produced in accordance with our method. The switch 1 comprises a plurality of spaced parallel metal slip rings or contact segment 2 which are embedded in a cylinder 3 of thermosetting plastic insulating material having an axially disposed hub 4 securely mounted therein. The slip rings 2 are provided with circumferentially extending medial slots 5 which are intersected adjacent each end thereof by transversely extending slots 6. The slots 5 and 6 extend through the rings 2 and into the plastic cylinder 3 as indicated at 7; and the slots 6 extend across the full width of the rings 2 and into the adjacent plastic material as indicated at 8.

The switch 1 is adapted to simultaneously control a plurality of different electrical circuits as the switch 1 is rotated, each ring controlling a different circuit, in timed sequence with respect to the circuits controlled by the other slip ring. The slots 5 and 6 of each slip ring 2 are therefore made in accordance with the particular circuit that ring controls, and the location of the slots 5 and 6 in the various rings 2 with respect to slots 5 and 6 in the other rings 2 is dependent upon the desired sequential control of the various circuits. In operation a pair of spaced contacts 9 and 10 in circuits 11 are held in contact with each of the slip rings 2 as the switch 1 is rotated. When the contacts 9 and 10 are separated by a slot 5 as shown at 12 in Fig. 1 the circuit 11 is open, and when the contacts 9 and 10 are not disposed on opposite sides of a slot 5 as shown at 13 and 14 in Fig. 1 the circuit 11 is closed.

Figure 4:
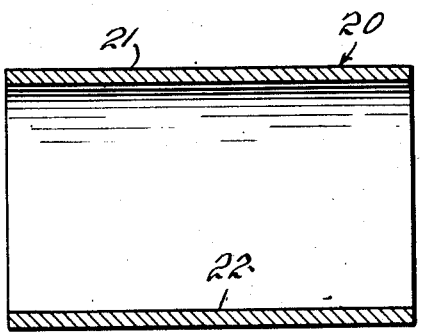
Fig. 4 is a longitudinal section view showing the first step in the production of sequence drum type switches as illustrated in Figs. 1 to 3 which consists of providing an open ended cylindrical metal tube of the requisite size.
Figure 5:
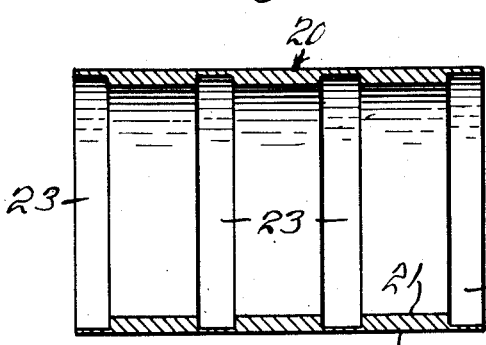
Fig. 5 is a view similar to Fig. 4 showing the second step of our method which consists of machining a plurality of spaced parallel annular grooves in the inner surface of the tube shown in Fig. 1.
Figure 6:
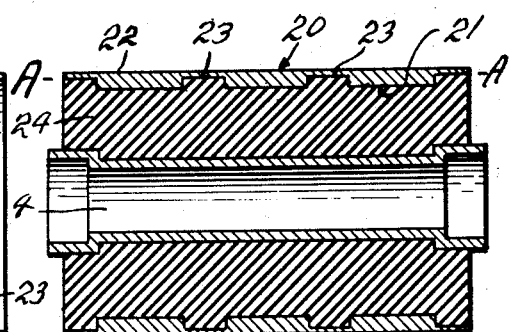
Fig. 6 is a view similar to Figs. 4 and 5 showing the next step of our method which consists of inserting a hub axially into the grooved tube as shown in Fig. 4 and filling the cavity between the hub and tube with thermosetting plastic insulating material.

In producing the sequence drum type switch 1 shown in Figs. 1 to 3 we provide an open ended cylindrical metal tube 20 having inner and outer surfaces 21 and 22, as shown in Fig. 4, and machine a plurality of spaced parallel annular slots 23 in the inner surface 21 of the tube 20, as shown in Fig. 5. The slots 23 are of such a depth as to leave only a very thin wall about each slot 23. The inner and outer diameters and the length of the tube 20 are all dependent upon the particular switch being produced. We then axially position the hub 4 in the grooved tube 20 and fill the cavity, including the slots 23, between the hub 4 and the inner wall 21 of the tube with suitable thermosetting plastic insulating material 24 as shown in Fig. 6. After the plastic material 24 has set and hardened into the cylinder 3 we machine away the outer surface 22 of the tube 20 down to the line a—a on Fig. 6, which removes the thin metal wall surrounding each of the slots 23 thus providing a plurality of spaced parallel slip rings 2 which are embedded in the cylinder 3 and insulated from each other. The slots 5 and 6 are then milled into the rings 2.

In Figs. 7 and 8 we have shown a slightly modified form of a drum type sequence switch in which the hub 4 of Figs. 1 to 3 is omitted; and in Fig. 11 we have shown another form of a drum type sequence switch in which the hub is omitted.

In producing the drum type switch shown in Figs. 7 and 8 we coat the inner wall 21 of the grooved tube shown in Fig. 5 with the thermosetting plastic insulating material, as shown in Fig. 9, and after it has set and hardened into a tube 25 we machine away the outer surface 22 of the metal tube 20 down to the line b—b on Fig. 9, which removes the thin metal wall surrounding each of the slots 23 and provides a plurality of spaced parallel slip rings 2 which are embedded in the plastic tube 25 and insulated from each other. The slots 5 and 6 are then milled into the rings 2.

In producing the form of drum type sequence switch shown in Fig. 11 we fill the grooved metal tube 20 shown in Fig. 5 with the thermosetting plastic insulating material 24, and then proceed as explained in connection with Figs. 7 to 10.

From the foregoing it will be apparent to those skilled in this art that we have provided a greatly improved method for accurately producing superior drum type sequence switches and flat type; and that we are entitled to cover any variations which may be made in the method described which are within the scope of the appended claim.

We claim:

The method of producing a sequence switch contact surface of the character described comprising providing a metallic open ended cylindrical tube having an unbroken wall of uniform thickness throughout the length thereof, forming a plurality of spaced parallel annular grooves in the inner surface of said tube, filling said grooves and coating the inner surface of said tube with thermosetting plastic material, machining the outer surface of said tube to a depth sufficient to remove the tubing material surrounding said grooves thereby providing a plurality of spaced parallel slip rings embedded in said plastic material, cutting a circumferentially extending segmental slot completely through each of said slip rings, and then cutting a pair of spaced transversely extending slots completely through each of said slip rings, each transversely extending pair of slots extending completely across a slip ring and intersecting the said longitudinally extending segmental slot therein between the ends thereof to thereby provide a pair of segments in each slip ring which are isolated from the remainder of the slip ring and from each other.

References Cited in the file of this patent
UNITED STATES PATENTS

| | | |
|---|---|---|
| 2,696,570 | Pandapas | Dec. 7, 1954 |
| 2,696,658 | Polard | Dec. 14, 1954 |